United States Patent Office 3,336,324
Patented Aug. 15, 1967

---

3,336,324
N-ALLYL-PYRIDINE-3-SULFONIC ACID BETAINE
Carl Richter and Georg Feth, Schaffhausen, Switzerland, assignors to Cilag-Chemie, a corporation of Switzerland
No Drawing. Filed June 24, 1966, Ser. No. 560,077
1 Claim. (Cl. 260—294.8)

This invention relates to a new organic chemical compound, and, more particularly, to N-allyl-pyridine-3-sulfonic acid betaine and the preparation thereof. This compound may be structurally represented by the following formula:

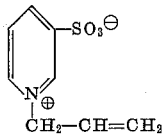

For the electrodeposition of nickel coatings, an aqueous acidic solution of a nickel salt is generally employed, which solution generally contains a luster-promoting agent. It has been found that lustrous and levelled nickel coatings are obtained when the subject compound, N-allyl-pyridine-3-sulfonic acid betaine, is used as an additive in conventional galvanic nickel baths. In addition to promoting luster, this additive has the property of levelling the rough and uneven surface of metals.

The subject compound may be prepared by interacting 3-pyridine sulfonic acid with allyl chloride in the presence of a base such as, for example, sodium hydroxide.

The following examples are intended to illustrate, but not to limit, the scope of the present invention.

*Example I*

To a solution of 30.4 g. sodium hydroxide in 120 ml. water, 120 g. 3-pyridine sulfonic acid are added with 190 g. ethanol and 57.6 g. allylchloride. This mixture is stirred for 3 hours at 105° C. in a stainless steel autoclave. After allowing to cool, 100 ml. water is added and the whole solution is boiled with charcoal for about 10 minutes, followed by filtration. The clear solution is evaporated to dryness in vacuo. The residue is treated with 185 g. of methanol and 20 ml. water, then heated to reflux and filtered. The residue is now washed with 20 g. methanol. The filtrate is cooled to 5° C. and allowed to stand overnight. Then the precipitate is separated by filtration and washed with 120 g. methanol. After drying at 70° C. in vacuo, N-allyl-pyridine-3-sulfonic acid betaine is obtained; M.P. 172–176° C.

*Example II*

This example illustrates a typical galvanic nickel bath employing the subject compound:

A:

| | |
|---|---:|
| Nickel sulfate g./l | 250 |
| Nickel chloride g./l | 40 |
| Boric acid g./l | 40 |
| N-allyl-pyridine-3-sulfonic acid betaine g./l | 0.4 |
| Sodium lauryl sulfate g./l | 0.5 |
| pH | 4.6 |
| Temperature °C | 20–60 |
| Current density amp./dm.$^2$ | 1–7 |

B:

| | |
|---|---:|
| Nickel sulfate g./l | 280 |
| Nickel chloride g./l | 30 |
| Boric acid g./l | 45 |
| N-allyl-pyridine-3-sulfonic acid betaine g./l | 0.6 |
| Sodium lauryl sulfate g./l | 0.8 |
| pH | 4.6 |
| Temperature °C | 20–60 |
| Current density amp./dm.$^2$ | 1–8 |

What is claimed is:
N-allyl-pyridine-3-sulfonic acid betaine.

No references cited.

WALTER A. MODANCE, *Primary Examiner.*
ALAN L. ROTMAN, *Asssistant Examiner.*